Patented July 29, 1930

1,771,435

UNITED STATES PATENT OFFICE

FREDERICK GELSTHARP, OF TARENTUM, PENNSYLVANIA, ASSIGNOR TO PITTSBURGH PLATE GLASS COMPANY, A CORPORATION OF PENNSYLVANIA

ABSORPTION GLASS

No Drawing.  Application filed December 11, 1926. Serial No. 154,314.

The invention relates to absorption glass and is particularly designed for use with celluloid in the making of reinforced glass, although not limited to use in such relation. As set forth in the patent to V. C. Edwards No. 1,467,030, absorption glass is desirable in composite sheets including celluloid because of the protection against discoloration of the celluloid which the glass affords, but the so-called actinic or absorptive glass is itself often subject to discoloration in the course of time incident to the action of light upon certain constituents of the glass, and it is the object of the present invention to provide a satisfactory absorptive glass which is not with age subject to material or noticeable discoloration.

Although not limited thereto, the invention is preferably applied in a reducing batch of the type set forth in the patent to J. C. Parkinson No. 1,536,919. Such batch may vary somewhat in proportions, but is ordinarily as follows:

| | Parts by weight |
|---|---|
| Sand | 1,000 |
| Soda ash | 300 |
| Limestone | 310 |
| Cerium hydrate | 50 |
| Common salt | 25 |
| Salt cake | 60 |
| Coal | 3 |
| Arsenic | 5 |

The cerium hydrate which is employed is preferably technically pure and the percentage of didymium oxide in this compound is so small that it has no color effect, which is quite a different situation as compared with the ordinary commercial cerium compound which may contain as much as 20 per cent of didymium oxide.

The foregoing is a reducing batch, that is, one of the type employing reducing compounds, such as coal, charcoal, arsenic, etc., commonly used for that purpose, this type of batch being distinct from what may be termed an oxidizing batch in which compounds such as nitrates are used for maintaining an oxidizing condition during melting. This batch produces a clear colorless glass when first made, but in the course of time a yellow or amber tint will develop which is objectionable for certain purposes, such as the manufacture of the composite glass heretofore referred to and the present invention is designed to overcome this difficulty. This is accomplished by adding to the batch a coloring compound which will neutralize the yellow tint which develops. The coloring compound preferably used is cobalt oxide. The amount required is very small, ordinarily one-fourth to one-half ounce for the batch above set forth. This amount of the oxide gives the glass a slight blue tint, which is unobjectionable and hardly noticeable when the glass is first made. This neutralizes the yellow tint which would develop in the glass as it ages, the blue tint in the glass as made gradually disappearing in the course of time, due to the neutralizing effect of the yellow tint. The final product is a light greenish tint similar to ordinary glass having high absorbing properties.

If in place of the batch above set forth, an oxidizing batch is used, employing a nitrate such as nitrate of soda, instead of the salt cake, the yellow tint, which would otherwise show, may be neutralized also by the use of a suitable coloring compound, such as cobalt oxide, the invention in its broader phase not being limited to a reducing batch.

What I claim is:

A clear glass having a blue tinge when first made with high ultra-violet ray absorbing properties containing cerium oxide, and formed by fusing a cerium compound of chemically pure quality in a reducing batch with one-fourth to one-half ounce of cobalt oxide in a batch approximating 1700 pounds.

In testimony whereof, I have hereunto subscribed my name this 2nd day of December, 1926.

FREDERICK GELSTHARP.